June 22, 1954
C. B. RICHEY
2,681,543
SIDE DELIVERY RAKE
Filed Feb. 23, 1951
3 Sheets-Sheet 1
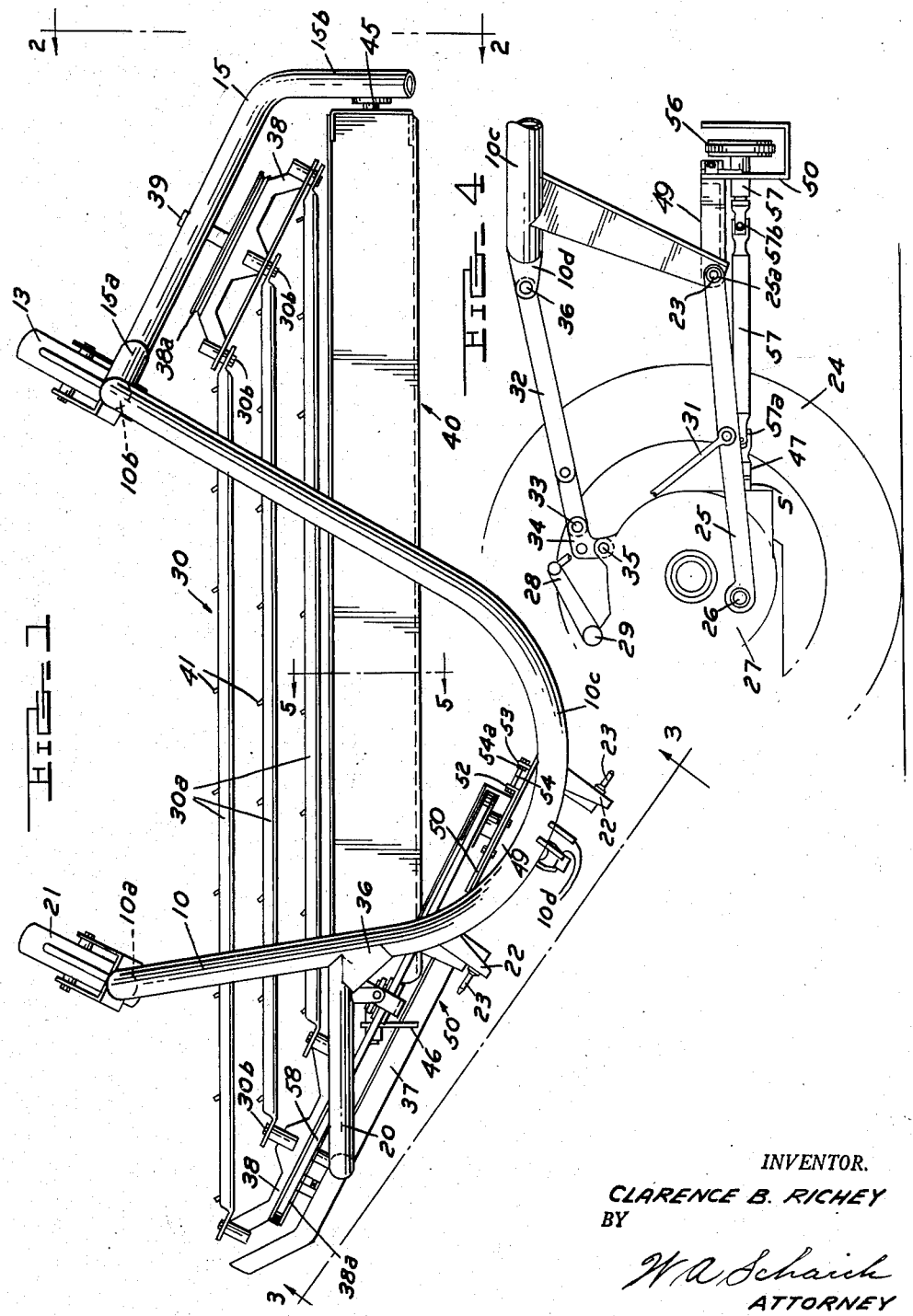
INVENTOR.
CLARENCE B. RICHEY
BY
*W. A. Schaich*
ATTORNEY

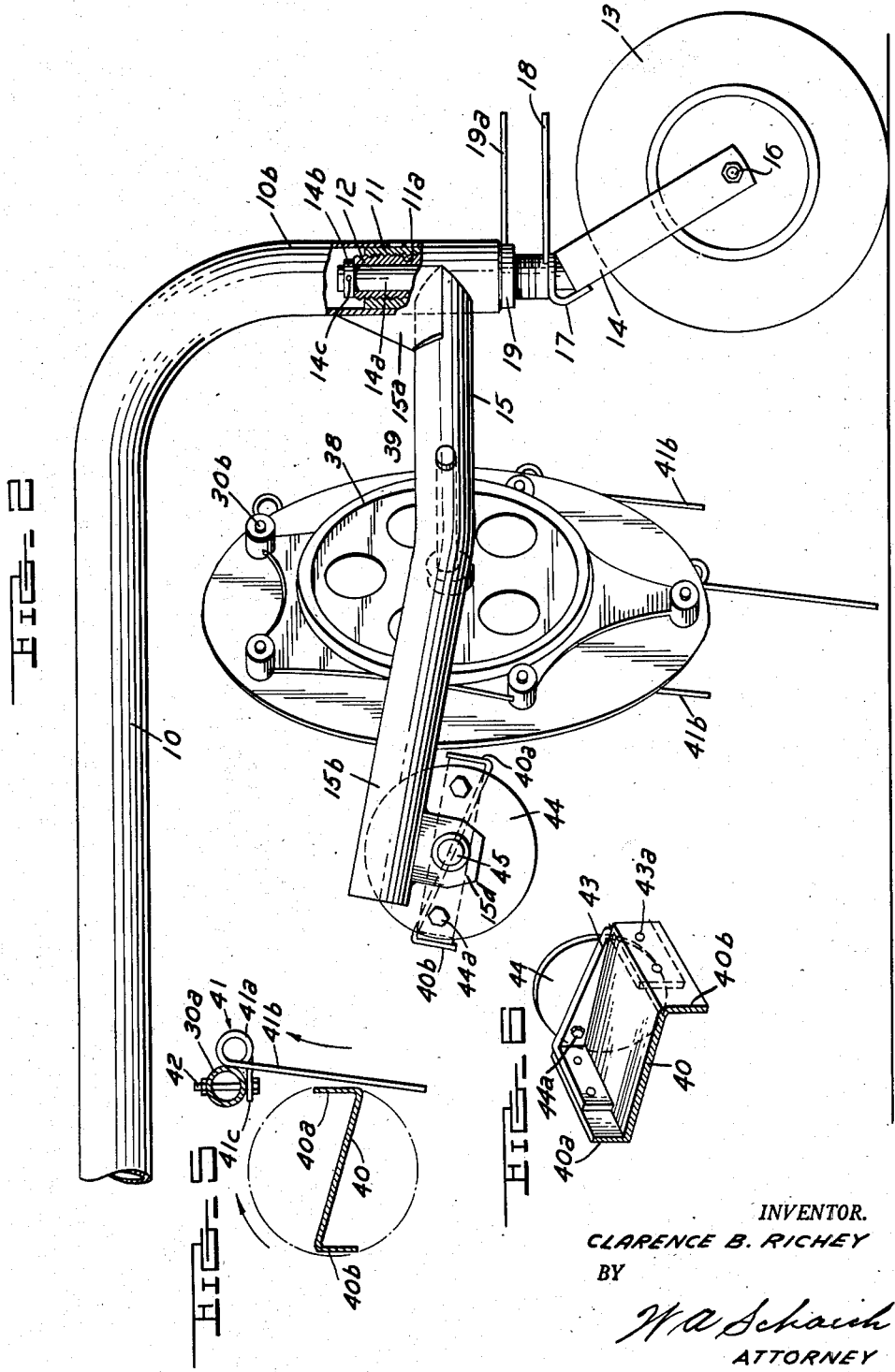

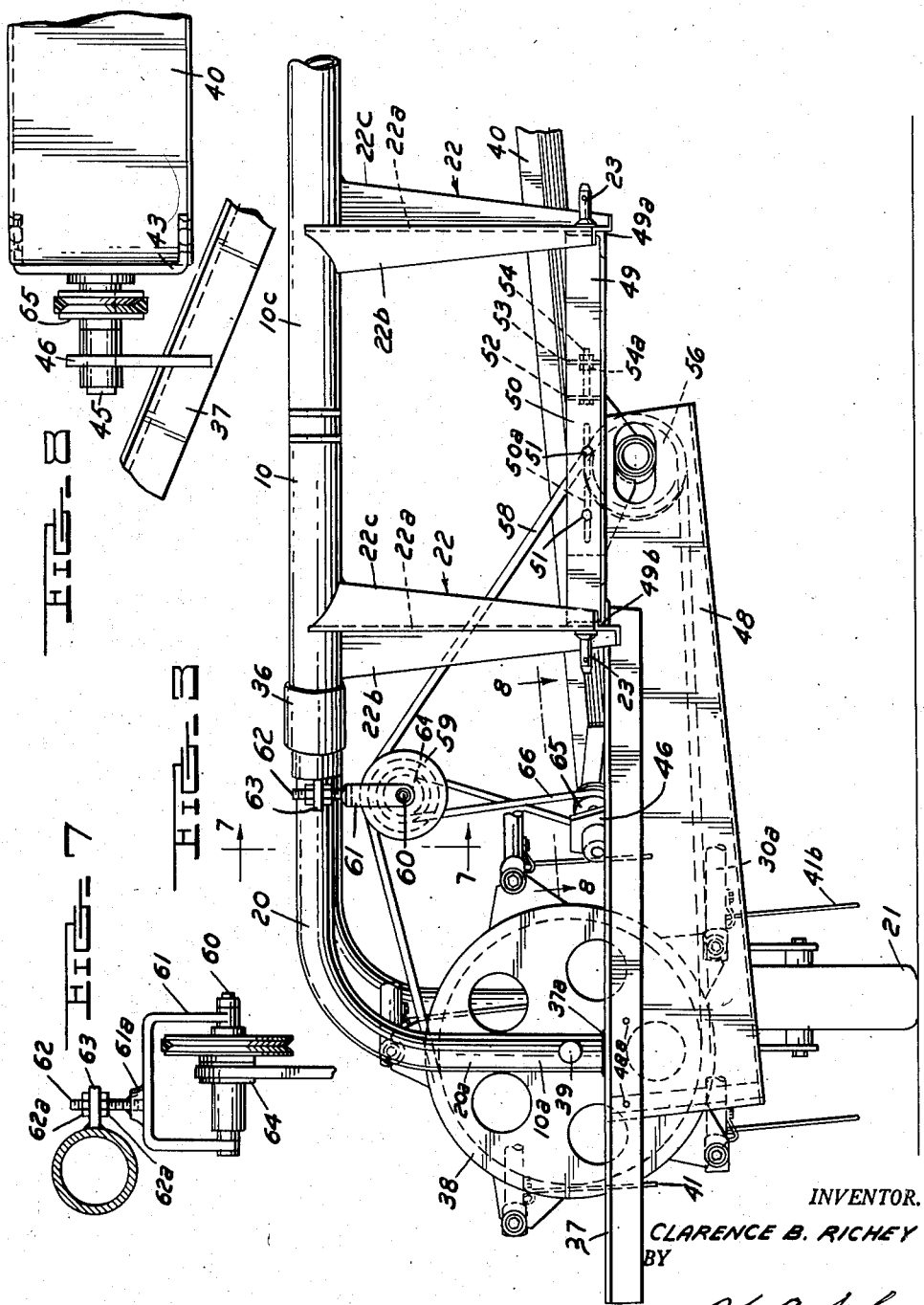

Patented June 22, 1954

2,681,543

UNITED STATES PATENT OFFICE 2,681,543

SIDE-DELIVERY RAKE

Clarence B. Richey, Royal Oak, Mich., assignor, by mesne assignments, to Ford Motor Company, Dearborn, Mich., a corporation of Delaware Application February 23, 1951, Serial No. 212,443

6 Claims. (Cl. 56—377)

This invention relates to an improved side delivery rake. As to some aspects, this application constitutes an improvement over the subject matter of my copending application Serial No. 136,305, filed December 31, 1949, now Patent No. 2,641,895, granted June 16, 1953.

Of the various implements utilized for raking and depositing a crop in a windrow, the side delivery rake is probably the best known and best liked for such purpose. This type of implement is readily hitched to a tractor whereby the implement is towed to the field and can be promptly utilized for gathering the crop with a minimum of operator effort. Nearly all side delivery rakes are relatively large implements and the frames of such implements have been relatively heavy and cumbersome, hence adding considerable unnecessary weight to the implement which not only is deleterious in the field but adds unnecessarily to the cost of the implement.

Accordingly, it is an object of this invention to provide an improved side delivery rake having a light rigid frame which effects a substantial saving in the weight of the implement while providing the necessary strength to withstand the hard usage imposed upon such an implement and the necessary adjustments for all types of operation and terrain.

Another object of this invention is to provide an improved crop stripper for a side delivery rake.

Still another object of this invention is to provide an improved power transmission arrangement for a side delivery rake.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a plan view of the side delivery rake.

Fig. 2 is an elevational view encompassed generally by the plane 2—2 of Fig. 1.

Fig. 3 is an elevational view encompassed generally by the plane 3—3.

Fig. 4 is a detailed view showing the mounting of the side delivery rake on the trailing draft links of a tractor of well-known make and illustrating the connection of the driving mechanism of such rake with the power-take-off shaft of the tractor.

Fig. 5 is a sectional view taken along the plane 5—5 of Fig. 1.

Fig. 6 is an enlarged detailed perspective view of a portion of the improved crop stripper showing the details of construction of such crop stripper.

Fig. 7 is an enlarged detailed sectional view taken along the plane 7—7 of Fig. 3.

Fig. 8 is an enlarged fragmentary plan view encompassed by the plane 8—8 of Fig. 3.

As shown on the drawings:

The improved side delivery rake constructed in accordance with this invention is best shown in Fig. 1 and comprises a main frame 10 having on each side thereof outwardly projecting arms 15 and 20 which rotatably mount a so-called raking drum 30. Forwardly of the raking drum 30 and parallel therewith a crop stripping device 40 is rotatably supported by arms 15 and 20. The raking drum and the crop stripper are rotated by a power transmission drive indicated generally by the numeral 50. Frame 10 is of tubular construction and as viewed in Fig. 1 is of generally U-shaped configuration in a horizontal plane and has depending ends 10a and 10b produced by bending the ends of such U-shaped frame downwardly as best shown in Figs. 2 and 3. In the extreme lower end portion of the downwardly turned end 10b of frame 10 there is press fitted a sleeve 11 which has an interiorly threaded bore 11a. An exteriorly threaded sleeve 12 cooperates in threaded relationship with the fixed sleeve 11 for a purpose to be presently described. A caster wheel or frame transporting wheel 13 is rotatably supported within a fork 14 by a transverse bolt 16. Fork 14 has a vertical stem portion 14a which fits within the bore of sleeve 12 in bearing relationship. A collar 14b secured as by a screw 14c to the upper end of stem portion 14a abuts the upper end of sleeve 12 to prevent downward displacement of the fork 14. Fork 14 is angularly disposed rearwardly relative to the stem portion as best shown in Fig. 2 and the bottom of threaded sleeve 12 rests on an angle member 17 welded to the top of fork 14 to provide a suitable bearing for the bottom of such sleeve. A horizontal handle 18 is secured by welding to the lower end of sleeve 12, thus by rotating such handle, sleeve 12 is vertically adjusted for varying the elevation of frame 10 and hence the working height of the rake. A lock nut 19 surrounds sleeve 12 and a handle 19a secured by welding thereto permits turning such nut tightly against the end surface of downwardly bent frame portion 10b to thereby lock sleeve 12 in a desired position of adjustment. A second caster or ground transporting wheel 21 is similarly mounted in the depending end portion 10a of frame 10. As the construction of such mounting is identical for wheel 13, further description thereof is believed unnecessary.

The bight portion 10c of frame 10 has a pair of oppositely disposed arms 22 secured thereto by welding in depending relationship. Arms 22 are constructed of plate material. Each arm 22 has a central vertical web portion 22a and oppositely directed flange-like portions 22b and 22c. Web 22a and flanges 22b and 22c taper in width downwardly as best shown in Fig. 3. A horizontal pin 23 is secured to the web portion 22a by riveting or welding.

As was previously mentioned, a tractor 24 of well-known make, having a pair of laterally spaced, power operated draft links 25, is preferably utilized for powering the side delivery rake of this invention. Draft links 25 are pivoted as at 26 to the rear axle housing 27 of tractor 24 and are vertically lifted by a pair of rocker arms 28 secured to the ends of a transverse rock shaft 29. Rock shaft 29 is in turn rotated by a built-in hydraulic mechanism (not shown). Rocker arms 28 are respectively connected to draft links 25 by a pair of connecting links 31. Tractor 24 is also provided with a top link 32 which is pivoted as at 33 to a rocker member 34 pivotally secured to the top of tractor axle housing 27 as by a pin 35. The rear end of top link 32 is pivotally mounted by a pin 36 between a pair of forwardly projecting transversely spaced lugs 10d which are secured by welding to the bight portion 10c of the rake frame, as best shown in Fig. 1. The trailing ends of draft links 25 are provided with conventional universally swiveling joints 25a which are apertured so that such trailing ends may be mounted on the horizontal pins 23 provided on the lower ends of arms 22. Thus the front end of frame 10 is carried on the power operated draft links of the tractor so that such end may be conveniently elevated or lowered to effect limited vertical adjustment of the raking drum 30 relative to the ground as will be later explained.

Raking drum 30 is rotatably supported between arms 15 and 20. Arm 15 is of tubular construction and is welded to the depending end portion 10b of frame 10 and the joint is reinforced by an arcuately shaped plate 15a respectively welded at its ends to the arm 15 and depending end portion 10b. Arm 15 is disposed generally horizontally relative to frame 10, as best shown in Fig. 2, but, however, has an end portion 15b which is bent forwardly as best shown in Fig. 1 and also slopes upwardly as shown in Fig. 2. Arm 20 is also of tubular construction and is welded to the left hand arm of U-shaped frame 10 as shown in Fig. 1. Arm 20 is angularly disposed relative to such arm portion of frame 10 as shown in Fig. 1 and is substantially horizontally disposed. A reinforcing arcuate gusset-like plate 36 is respectively welded at its ends to arm 20 and frame 10 to reinforce the connecting point of such arm to such frame. Arm 20 has a downwardly bent end 20a which is disposed at right angles to the horizontal portion of such arm. A transverse angle iron member 37 is welded to the bottom end of arm 20 as shown at 37a and such angle member extends obliquely and horizontally from such arm for connection as by welding to the left hand depending arm 22 as shown in Figs. 1 and 3.

Arms 15 and 20 respectively support rake tooth bar supporting discs 38. Each disc 38 is rotatably journaled on a stub axle 39 secured as by welding within suitable apertures in each of the arms 15 and 20. Stub axles 39 are so disposed that the discs 38 will be disposed in parallel relationship, but with their axes offset, as best shown in Fig. 1. A plurality of rake tooth bars 30a are respectively rotatably secured at their ends to discs 38 by bolts 30b. Each of the rake tooth bars 30a has a plurality of conventional rake teeth 41 secured thereon in axially spaced relationship. Rake teeth 41 have an arcuate spring portion 41a and a depending tine portion 41b. The arcuate spring portion 41a terminates in an eye 41c and through such eye a bolt 42 is inserted which likewise passes through aligned apertures in tooth bars 30a to secure the rake teeth 41 thereto.

Raking drum 30 is rotated by a drive transmission arrangement to be later described. A crop stripper 40 is provided for stripping any of the crop carried over by the raking drum 30 and to prevent clogging of such raking drum. Crop stripper 40 comprises a plate member bent into a Z-shaped cross-sectional configuration as best shown in Fig. 6 and symmetrically disposed relative to the axis of rotation. Thus there is formed edge flanges 40a and 40b on such member. A U-shaped strap member 43 is secured to each end of stripper 40 by a plurality of rivets 43a. Each U-shaped strap member 43 is so disposed on the ends of strap 40 so that the bight portion thereof centrally bisects the longitudinal axis of the crop stripper. A disc 44 is secured to each of the U-shaped strap members by a pair of bolts 44a and each of the discs 44 has an axial stub axle 45 projecting outwardly therefrom. The right hand stub axle 45 as shown in Fig. 1 is journaled in a bracket 15d dependingly secured to the forwardly and upwardly sloped end portion 15b of arm 15. The other stub axle 45 provided in the left hand end of crop stripper 40 is journaled in a plate-like bracket 46 welded to the transverse angle iron member 37 as shown in Figs. 1 and 8. Thus crop stripper 40 is disposed with its axis generally parallel to the axis of raking drum 30. Stub axles 45 respectively mounted in arm 15 and on the angle member 37 are so positioned as to place the peripheral path of crop stripper 40 adjacent to the peripheral path of raking drum 30 so that any adhering crop may be readily stripped from the tines 41b of raking teeth 41 by the crop stripper 40 as the raking drum rotates.

Both the crop stripper 40 and the raking drum 30 are power driven by suitable connection to the power-take-off shaft 47 of tractor 24. The power transmission arrangement will now be described. A depending guard plate 48 is secured to angle iron member 37 by a plurality of bolts 48a. Plate 48 extends beyond angle member 37 to a point substantially centrally of the two hitch pins 23. A pulley mounting bracket 49 of angle iron construction is supported between the depending arms 22. Bracket 49 is of U-shaped construction and is horizontally disposed as best shown in Figs. 1 and 3; the ends of the arms of such bracket are respectively secured to the lowermost ends of depending brackets 22 as shown at 49a and 49b. One end of bracket 49 rests on top of angle member 37 as shown in Fig. 3 and bracket 49 is arranged substantially parallel with such angle member. A pulley mounting bracket 50 of substantially rectangular plate construction is mounted in depending relationship to the bight portion of bracket 49. Bracket 50 has a pair of longitudinally disposed slots 50a through which a pair of transverse bolts 51 are respectively inserted to secure such bracket to the bight portion 49. Slots 50a permit limited longitudinal adjustment of such bracket for a purpose to be later described. Bracket 50 has a lug 52 welded to the right hand side thereof as shown in Fig. 3 and a similar lug 53 is welded to the bight portion of bracket 49 opposite lug 52 and spaced therefrom. A bolt 54 insertable through aligned holes in lugs 52 and 53 provide a convenient means for effecting longitudinal movement of bracket 50. A lock nut 54a enables bolt 54 to be locked in any position of desired adjustment.

A power driven pulley 56 is secured to a shaft (not shown) which is journaled in a bearing 57 which is secured to mounting bracket 50 as by welding. The tractor's power-take-off shaft is connected to pulley 56 by a telescoping shaft 57. Telescoping shaft 57 has universal joints 57a and 57b respectively provided on its ends to permit substantial misalignment of pulley 56 with power-take-off shaft 57 as when frame 10 is raised by the power-lifted draft links 25. Disc 38 has an annular V-shaped groove 38a provided on the back surface thereof as best shown in Fig. 1 and a belt 58 connects pulley 56 with the left hand disc 38. Belt 58 is likewise trained over a belt tightening pulley 59 rotatably mounted on a shaft 60 supported by an inverted U-shaped bracket 61. Bracket 61 has an integral boss 61a provided on the top of the bight portion of such bracket as shown in Fig. 7 and a threaded stud 62 secured to boss 61a projects vertically upwardly and passes through a horizontally disposed lug 63 welded to the arm 20 adjacent the reinforcing gusset 36. A pair of lock nuts 62a secure stud 62 in a desired position of adjustment. Shaft 60 in bracket 61 also mounts a second pulley 64. Between the left hand end of crop stripper 40 and the bearing bracket 46, a pulley 65 is mounted on stub axle 45. A belt 66 connects pulley 64 with pulley 65 whereby crop stripper 40 is rotated. Since pulleys 59, 64 and 65 are all much smaller than disc 38 the crop stripper 40 is rotated much faster than the raking reel. Belt 66 is preferably crossed to rotate crop stripper 40 in the opposite direction to that of the raking drum 30.

From the above description it is clearly apparent that there is here provided a side delivery rake of improved construction. Not only is the frame of this improved side delivery rake of simplified construction, but such frame is rugged and relatively simple to make which thereby not only reduces the manufacturing cost but increases the useful life of such frame. Further, adjustment of the elevation of the raking drum is readily effected by readily adjusting the height of the caster wheels relative to the frame end portion. Lastly, the crop stripper and the drive therefor have been greatly simplified and improved.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a side delivery rake for use with a tractor having power-lifted hitch links, a frame comprising a unitary piece of tubing bent into a generally U-shaped configuration in a horizontal plane and having its bight portion disposed forwardly, the trailing ends of said tubing being deformed downwardly, a pair of wheels respectively mounted on said trailing ends, a pair of spaced brackets secured to said bight portion of said tubing, and hitch points on said brackets for connecting said frame to the tractor power-lifted hitch links, whereby the transporting height of the rake is controllable by said hitch links.

2. In a side delivery rake for use with a tractor having power-lifted hitch links, a frame comprising a unitary piece of tubing bent into a generally U-shaped configuration in a horizontal plane and having its bight portion disposed forwardly, the trailing ends of said tubing being deformed downwardly to a generally vertical position, a wheel mounting threadably secured in each of said trailing ends for vertical adjustment relative thereto, a wheel journaled on each wheel mounting, a pair of spaced brackets secured to said bight portion of said tubing, and hitch points on said brackets for connecting said frame to the tractor power-lifted hitch links, whereby the transporting height of the rake is controllable by said hitch links.

3. In a side delivery rake for use with a tractor having power-lifted hitch links, a frame comprising a unitary piece of tubing bent into a generally U-shaped configuration in a horizontal plane and having its bight portion disposed forwardly, the trailing ends of said tubing being deformed downwardly to a generally vertical position, a bearing sleeve threadably mounted in each of said trailing ends for vertical adjustment relative thereto, a pair of wheel brackets having cylindrical portions respectively journaled in said bearing sleeves for swiveling movements, a pair of wheels respectively journaled on said wheel brackets, a pair of spaced brackets secured to said bight portion of said tubing, and hitch points on said brackets for connecting said frame to the tractor power-lifted hitch links, whereby the transporting height of the rake is controllable by said hitch links.

4. The combination defined in claim 3 wherein the threaded portion of each of said bearing sleeves extends below said corresponding tubing end, and lock nut means cooperating therewith.

5. In a side delivery rake having a frame and a raking reel rotatably mounted on said frame, a crop stripper rotatably mounted on said frame adjacent said raking reel and on an axis generally parallel to said reel, said crop stripper comprising a unitary element of Z-shaped cross section symmetrically disposed relative to the axis of rotation.

6. In a side delivery rake for use with a tractor having power-lifted hitch links, a frame comprising a unitary piece of tubing bent into a generally U-shaped configuration in a horizontal plane and having its bight portion disposed forwardly, the trailing ends of said tubing being deformed downwardly to a generally vertical position, a wheel mounting threadably secured in each of said trailing ends for vertical adjustment relative thereto, a wheel mounting, a pair of spaced brackets secured to said bight portion of said frame, and hitch points on said brackets for connecting said frame to said power-lifted hitch links, whereby the transporting height of the rake is controllable by said hitch links, a first bearing means on one of said trailing ends for supporting one end of a raking reel, and a second bearing means secured to a medial portion of the other arm of said frame for supporting the other end of a raking reel, a third bearing means on one of said trailing ends for supporting one end of a rotatable crop stripping element, and a fourth bearing means secured to a medial portion of the other arm of said frame for supporting the other end of a rotatable crop stripping element.

References Cited in the file of this patent

UNITED STATES PATENTS

| Number | Name | Date |
|---|---|---|
| 888,546 | Sperry | May 26, 1908 |
| 1,034,957 | Bering et al. | Aug. 6, 1912 |
| 2,451,402 | Myers | Oct. 12, 1948 |
| 2,497,717 | Bowman | Feb. 14, 1950 |
| 2,498,650 | Crain | Feb. 28, 1950 |
| 2,597,828 | Spurlin | May 20, 1952 |